Patented Apr. 4, 1950

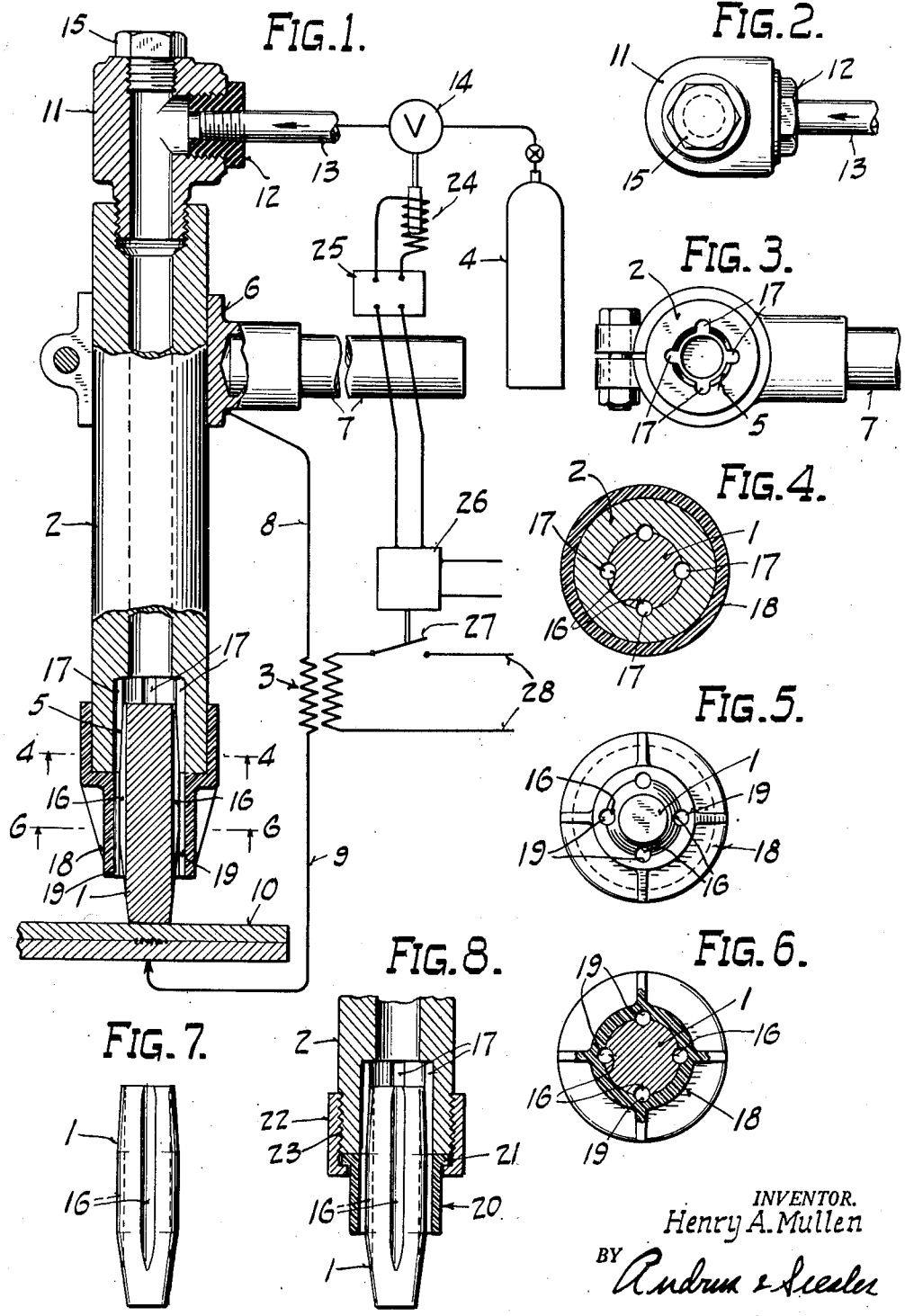

2,502,876

UNITED STATES PATENT OFFICE 2,502,876

ELECTRIC RESISTANCE SPOT WELDING APPARATUS

Henry A. Mullen, Milwaukee, Wis., assignor to Ampco Metal, Inc., Milwaukee, Wis., a corporation of Wisconsin Application January 19, 1949, Serial No. 71,565

6 Claims. (Cl. 219—4)

This invention relates to electric resistance spot welding apparatus, and more particularly to the construction of the welding tip and the holder whereby the refrigerant cooling and protection of the tip and workpiece against oxidation set forth in Patent No. 2,416,374 to P. E. Brunberg, may be more readily attained.

One of the principal objects of the present invention is to simplify and reduce the cost of the construction of both the tip and the holder.

Another object of the invention is to provide a more effective cooling of the tip.

Another object is to provide a tip which may be repeatedly redressed to give a longer life thereto.

An embodiment of the invention is illustrated in the accompanying drawings in which:

Figure 1 is a side elevation of the welding apparatus with parts broken away and sectioned and with the electric and refrigerant supply means illustrated schematically;

Fig. 2 is a plan view of the holder;

Fig. 3 is a lower end view of the holder with the tip and shield removed;

Fig. 4 is a transverse section taken on line 4—4 of Fig. 1 showing the tip and shield secured to the holder;

Fig. 5 is a lower end view of the assembled apparatus showing the tip and shield;

Fig. 6 is a transverse section through the tip and shield taken on line 6—6 of Fig. 1;

Fig. 7 is a side elevation of the tip; and

Fig. 8 is a detail section illustrating a modified form of shield.

The spot welder comprises, in general, a welding tip 1 and a tip holder 2, the latter being connected to a suitable welding current source such as transformer 3 and to a suitable refrigerant supply such as the $CO_2$ container 4.

The tip 1 consists of a solid round bar of copper alloy adapted to have high hardness and electrical conductivity under spot welding conditions, and of a suitable diameter for effecting a spot weld of the character desired having regard to the current density employed and heat conductivity of the electrode tip.

The length of tip 1 is determined by factors of the necessary clearance between the holder and the work.

The upper end of the tip 1 is either threaded into the holder 2 or wedged therein by being tapered and fitting into a complemental tapered bore 5 in the lower end of the holder, as shown.

The holder 2 consists of a hollow cylindrical barrel having the lower end taper bored at 5 as previously described to receive and hold the tip 1.

The length of the barrel of holder 2 should be sufficient to accommodate the clamp 6 on the end of the handle or pressure arm 7 which carries the holder and is adapted to hold or manipulate the same in welding. A flexible lead 8 extends from the transformer secondary to clamp 6. The other lead 9 from the transformer secondary is generally connected to a corresponding electrode holder and tip on the opposite side of the workpiece 10 and which cooperates with tip 1 and holder 2 in welding.

The upper end of barrel 2 carries a hollow head 11 threaded thereto and which has an insulating spud 12 coupling the same to a conduit 13 leading from container 4. A suitable expansion valve 14 is disposed in conduit 13 to control the release of $CO_2$ from container 4 and its passage to head 11.

The head 11 has its interior connected through spud 12 to conduit 13 for receiving refrigerant $CO_2$ or the like, and has a corresponding outlet passage leading into barrel 2 through the threaded connection therewith for discharging refrigerant into the barrel.

The head 11 also has a vertical opening through its top which is normally closed by cap screw 15 and which is in alignment axially through the head and barrel 2 with tip 1 for the purpose of receiving a suitable rod (not shown) to drive the tip from its wedging relation with the barrel when it is desired to remove the tip.

In carrying out the invention either the tip 1 or the lower end of holder barrel 2 or both tip 1 and barrel 2, as shown, are constructed to provide for the escape of refrigerant and its simultaneous expansion around the tip and surrounding the entire weld region during the weld operation.

For this purpose the tip 1, shown, has a plurality of longitudinal grooves 16 in its outer periphery and which are circumferentially spaced to register with corresponding grooves 17 in the taper bore 5 of holder 2, thereby providing by means of the complemental grooves 16 and 17 a series of holes extending from the interior of the holder and through which refrigerant escapes to the weld zone.

If tip 1 is constructed by extrusion it is a simple matter to form the grooves 16 therein by the extrusion die and to thereafter taper both ends of the tip as shown in Fig. 7. In the tapering operation the depth of grooves 16 becomes tapered to the vanishing point at the lower end, i. e. generally the amount of the taper is greater than the depth of the extruded groove. At the upper end the taper is generally less than the depth of the grooves 16 so that the grooves open into the holder 2.

Grooves 17 are shown machined in the tapered bore 5 of holder 2 to be parallel to the axis of the holder, so that the grooves increase in depth up the taper. In this way, when the tip 1 is inserted in the holder 2 with grooves 16 and 17 in registry with each other, the respective holes formed by corresponding grooves 16 and 17 may be of the same size throughout the length thereof.

It is possible to construct grooves 16 somewhat larger than grooves 17, whereby there will be a gradual increase or enlarging taper in the corresponding holes from the inner ends thereof toward the outer ends, so that some expansion of refrigerant gas is made possible throughout its passage down the tip and the tip is maintained relatively cool at its upper end.

Generally, it will be desirable to provide for some expansion of refrigerant as it enters barrel 2 through head 11. If this is done, as by constructing the inlet passage through coupling 12 of a restricted capacity, then it will also be desirable to have the total capacity or cross section of the holes formed by grooves 16 and 17 substantially greater than that for the restricted passage in coupling 12. Otherwise the desired controlled expansion of refrigerant may not occur between the coupling and the tip.

The major expansion of the refrigerant and its major cooling effect should occur as the refrigerant is discharged from grooves 16 around the lower end of tip 1. Where an inert refrigerant such as $CO_2$ is employed this expansion can be utilized to sweep away all free oxygen from the immediate weld zone, thereby submerging the weld in a non-oxidizing medium.

If a substantial expansion of the refrigerant is confined to a sweeping zone of refrigerant gases engaging the workpiece immediately surrounding the tip and weld zone, the workpiece will be cooled and a greater steepness of heat gradient surrounding the spot being welded will be created whereby the weld is virtually quenched. The effect of this surrounding of the weld by a heat quenching zone is to provide for spot welding of metals and alloys which would otherwise be difficult to spot weld due to their metallurgical characteristics when cooled slowly. So-called air hardening alloys can be spot welded without danger of developing a ring of defects around the weld.

In order to obtain the maximum desired effects described above, applicant provides a temporary shield 18 which fits over the lower end of holder 2 and extends downwardly about the body of tip 1, with the lower end of the shield spaced from the position of the workpiece 10 to provide the desired expansion zone for the refrigerant immediately surrounding the tip and weld.

Shield 18 may be of a molded destructible material such as fire resistant cellulosic composition or a synthetic resinous composition, so that its lower end may be readily broken or cut away as the tip 1 is redressed from time to time in service.

The shield 18, preferably, is held in place by a sliding grip upon the lower end of holder 2. Other holding means may be provided either by threading the shield upon the holder or by securing the shield to tip 1.

If desired, the shield 18 may fit relatively close around the body of tip 1 and may have internal grooves 19 therein complemental to grooves 16 to more or less confine the refrigerant expansion to the zone immediately adjacent workpiece 10.

The shield illustrated in Fig. 8 consists of a tube 20 of a synthetic resinous material surrounding tip 1 and which is flanged outwardly at 21 to be secured at its upper end between a suitable sheet metal clamp 22 at the end of holder 2. Clamp 22 may have coarse threads 23 which provide for its threading onto the holder 2, as shown.

The application of refrigerant to the weld should be relatively synchronized with the welding operation. For this purpose, valve 14 may be operated by an electric solenoid 24 which in turn is controlled by a timer 25 operated by a circuit from the main welding timer 26. Timer 26 controls a switch 27 in the primary circuit 28 for transformer 3.

The timer 25 is adapted to provide a delayed closing for the valve to thereby maintain a supply of refrigerant to the weld zone for a predetermined time after completion of each weld and effect proper quenching of the weld zone and cooling of the tip. The timer 25 may be constructed to adjustably provide opening of valve 14 either in advance of closing of the switch 27 or simultaneously therewith or following the same, as may be desired.

The invention provides a whole new system of spot welding wherein the metallurgical characteristics of the workpiece may be utilized to prevent defects in the weld.

Various embodiments of the invention may be employed within the scope of the accompanying claims.

I claim:

1. In an electric resistance spot welder, an electrode tip comprising a solid electrically conductive allow body constituted of generally cylindrical bar stock tapered at both ends and having a plurality of longitudinally extending circumferentially spaced parallel grooves, the taper of said body at the upper end being generally less in radial reduction than the depth of said grooves whereby the latter extend upwardly to the end of the tip.

2. In an electric resistance spot welder, an electrode tip comprising a solid electrically conductive alloy body constituted on generally cylindrical bar stock tapered at both ends and having a plurality of longitudinally extending circumferentially spaced parallel grooves, the taper of said body at the upper end being generally less in radial reduction than the depth of said grooves whereby the latter extend upwardly to the end of the tip and the taper of said body at the lower end being generally greater in radial reduction than the depth of said grooves whereby the latter disappear before reaching the lower end of the tip.

3. In an electric resistance spot welder, an electrode tip comprising a solid electrically conductive alloy body constituted of generally cylindrical bar stock tapered at both ends and having a plurality of circumferentially spaced parallel grooves extending along the central cylindrical body of said tip and into said tapered end portions.

4. In an electric resistance spot welder, an electrode tip comprising a solid electrically conductive alloy body constituted of generally cylindrical bar stock tapered at the upper end and having a plurality of circumferentially spaced parallel grooves extending along the cylindrical body of said tip and into said tapered end portion.

5. In an electric resistance spot welder, a tubular electrode holder having a tapered recess at its lower end to receive a tip, an electrode tip comprising a solid electrically conductive alloy body constituted of generally cylindrical bar stock tapered at its upper end to fit into said tapered recess of said holder, a plurality of circumferentially spaced parallel longitudinal grooves in said tip reduced in section at their upper ends by reason of the taper of the tip, and a corresponding number of complemental grooves in the tapered surfaces of the recess in said holder disposed complemental to said first named grooves whereby refrigerant may be supplied to the weld zone at the lower end of said tip from within said tubular holder.

6. In an electric resistance spot welder, a tubular electrode holder having a tapered recess as its lower end to receive a tip, an electrode tip comprising a solid electrically conductive alloy body constituted of generally cylindrical bar stock tapered at its upper end to fit into said tapered recess of said holder, a plurality of circumferentially spaced parallel longitudinal grooves in said tip reduced in section at their upper ends by reason of the taper of the tip, and a corresponding number of complemental grooves in the tapered surface of the recess in said holder disposed complemental to said first named grooves whereby refrigerant may be supplied to the weld zone at the lower end of said tip from within said tubular holder, said registering complemental grooves being shaped to provide channels tapering to a larger section from the upper inner end thereof toward the lower outer end for the gradual expansion of the refrigerant as it discharges through the channels.

HENRY A. MULLEN.

REFERENCES CITED

The following references are of record in the file of this patent:

UNITED STATES PATENTS

| Number | Name | Date |
| --- | --- | --- |
| 1,281,454 | White | Oct. 15, 1918 |
| 2,001,638 | Paugh | May 14, 1935 |
| 2,051,284 | Ball | Aug. 18, 1936 |
| 2,281,335 | Somes | Apr. 28, 1942 |
| 2,329,904 | Howard | Sept. 21, 1943 |
| 2,355,145 | Carlson | Aug. 8, 1944 |
| 2,416,374 | Brunberg | Feb. 25, 1947 |

FOREIGN PATENTS

| Number | Country | Date |
| --- | --- | --- |
| 40,610 | France | Apr. 16, 1932 |
| 716,098 | France | Oct. 5, 1931 |